United States Patent [19]

Voigt

[11] 4,314,188
[45] Feb. 2, 1982

[54] STABLE SUBSYNCHRONOUS DRIVE SYSTEM FOR GYROSCOPE ROTOR

[75] Inventor: Henry K. Voigt, North Merrick, N.Y.

[73] Assignee: Sperry Corporation, New York, N.Y.

[21] Appl. No.: 20,579

[22] Filed: Mar. 15, 1979

[51] Int. Cl.³ .......................... H02P 5/28; G05B 5/01
[52] U.S. Cl. .................................... 318/721; 318/314; 318/318
[58] Field of Search ............... 318/701, 720, 721, 314, 318/318, 722, 723

[56] References Cited

U.S. PATENT DOCUMENTS

| | | | |
|---|---|---|---|
| 3,110,853 | 11/1963 | Jones | 318/318 |
| 3,176,208 | 3/1965 | Gifft | 318/314 |
| 3,206,665 | 9/1965 | Burlingham | 318/314 |
| 3,331,006 | 7/1967 | Strand et al. | 318/314 |
| 3,495,152 | 2/1970 | Keiser et al. | 318/314 |
| 3,906,319 | 9/1975 | Milligan | 318/318 |
| 3,950,682 | 4/1976 | Dohanich, Jr. | 318/318 X |
| 4,099,107 | 7/1978 | Eder | 318/721 X |
| 4,250,442 | 2/1981 | McCammon | 318/722 X |

FOREIGN PATENT DOCUMENTS

| | | | |
|---|---|---|---|
| 2744361 | 4/1979 | Fed. Rep. of Germany | 318/318 |
| 7522465 | 3/1977 | France | 318/318 |
| 46-20971 | 6/1971 | Japan | 318/318 |

*Primary Examiner*—Stanley J. Witkowski
*Assistant Examiner*—Richard M. Moose
*Attorney, Agent, or Firm*—Howard P. Terry

[57] ABSTRACT

The present invention concerns apparatus for precisely driving the rotors of precision gyroscopes such as small, flexure mounted rate of turn or inertial gyroscopes. The rotor is servo operated subsynchronously whereby a reference frequency generated by a spin frequency reference generator is synchronized with a precisely stable frequency standard, assuring the maintenance of constant rotor speed and permitting precisely calibrated gyroscope torquing. The gyroscope motor rotor is thus spun at a subsynchronous frequency so that the poles in the hysteresis ring are constantly rotating about the ring and their effect on average magnetic bias is averaged substantially to zero. Further, the drive motor is operated at peak efficiency because its excitation is automatically and closely adjusted to be just sufficient to generate only the necessary motor torque for subsynchronous operation.

6 Claims, 3 Drawing Figures

STABLE SUBSYNCHRONOUS DRIVE SYSTEM FOR GYROSCOPE ROTOR

BACKGROUND OF THE INVENTION

1. Field of the Invention

The present invention pertains to the field of gyroscopic devices and more particularly concerns stable subsynchronous drive systems for driving the rotors of gyroscope spin motors.

2. Description of the Prior Art

Gyroscopes, especially those of the rate of turn type, typically use hysteresis synchronous motors so that the rotor may be driven at a known constant speed. Such operation is desired where an output of the gyroscope is a precise calibrated output only for a given constant rate of rotation of the gyroscope rotor. However, the standard hysteresis synchronous motor has an inherent property of random synchronization. The seat of this property lies in the fact that each time the motor is started and subsequently synchronizes, the permanent magnetic poles of the hysteresis ring of the motor are re-formed. Further, each time they are newly generated, their locations randomly shift and so do their magnitudes, all apparently under the influence of the revolving magnetomotive force in the ring. Thus, the magnetic axis as established in the rotor in its last preceding operating period will normally not be in alignment with the revolving field when the motor is subsequently started and a new synchronizing point accordingly materializes.

The foregoing random readjustment can induce undesired differences in the magnitude and phase of motor-induced vibrations and can alter the magnetic coupling between the spin motor stator and the gyroscope rotor. The effects of the latter problems are of special concern for flexure-supported free rotor gyroscopes wherein the gyroscope rotor is articulated with respect to the spin motor stator.

It is understood that one attempt has been made, but with minor success, to overcome the foregoing problem by periodic high frequency interruption of the spin motor supply to use an averaging effect of many rapid random resynchronizations. The noise introduced by the method is detrimental to the achievement of low random drift; also, rotor slip caused by the periodic non-synchronous operation of the gyroscope rotor induces uncertainty in the rotor speed, an uncertainty that cannot be tolerated in calibrated inertial systems. Another suggested method was to use a periodic advance or retreat of the spin motor magnetic field which causes remagnetization of the hystereis ring without the periodic rotor speed change caused by the power interruption technique. Although there appears to be a beneficial averaging feature also in this latter technique, it does not overcome rotor speed uncertainty and it is therefore not suited for use in precision applications.

SUMMARY OF THE INVENTION

The present invention concerns apparatus for precisely driving the rotors of precision gyroscopes such as small, flexure mounted rate of turn or inertial gyroscopes of the kind further discussed herein. The rotor is servo operated subsynchronously whereby a reference frequency generated by a spin frequency reference generator is synchronized with a precisely stable frequency standard, assuring the maintenance of constant rotor speed and permitting precisely calibrated gyroscope torquing. The gyroscope motor rotor is thus spun at a subsynchronous frequency so that the poles in the hysteresis ring are constantly rotating about the ring and their effect on average magnetic bias is averaged substantially to zero. Further, the drive motor is operated at a peak efficiency because its excitation is automatically and closely adjusted to be just sufficient to generate only the necessary motor torque for subsynchronous operation.

DESCRIPTION OF THE PREFERRED EMBODIMENTS

The electrical rotor-driving circuit of the present invention may be used in many applications of synchronous and induction motors, though it is of special interest for use in driving synchronous motors used to spin the rotors of dual-axis torque feedback flexure rate gyroscopes used, for example, in aircraft strapped-down attitude and heading reference instruments and of the general kind described in the following U.S. patents assigned to Sperry Rand Corporation:

U.S. Pat. No. 2,719,291—"Rate of Turn Gyroscpe'-'—W. G. Wing, issued Sept. 27, 1955, U.S. Pat. No. 3,529,477—"Gyroscopic Rotor Suspension"—T. R. Quermann, issued Apr. 10, 1968, U.S. Pat. No. 3,557,629—"Pick Off and Torquing Device"—T. R. Quermann, issued Jan. 26, 1971, and U.S. Pat. No. 3,677,097—"Protective Stops for a Flexure Suspended Gyroscopic Rotor"—T. R. Quermann, issued July 18, 1972.

These and other patents describe the structure and operation of typical flexure rate gyroscopes. Such gyroscopes are characterized by having a gyroscopic rotor that is, in effect, freely suspended by flexure support members for spinning about a spin axis by means of an electric-motor-driven shaft journalled in the instrument casing.Universal tilting of the gyroscope rotor about a pair of axes both perpendicular to the normal spin axis is permitted by the flexure support.

Figure 1:
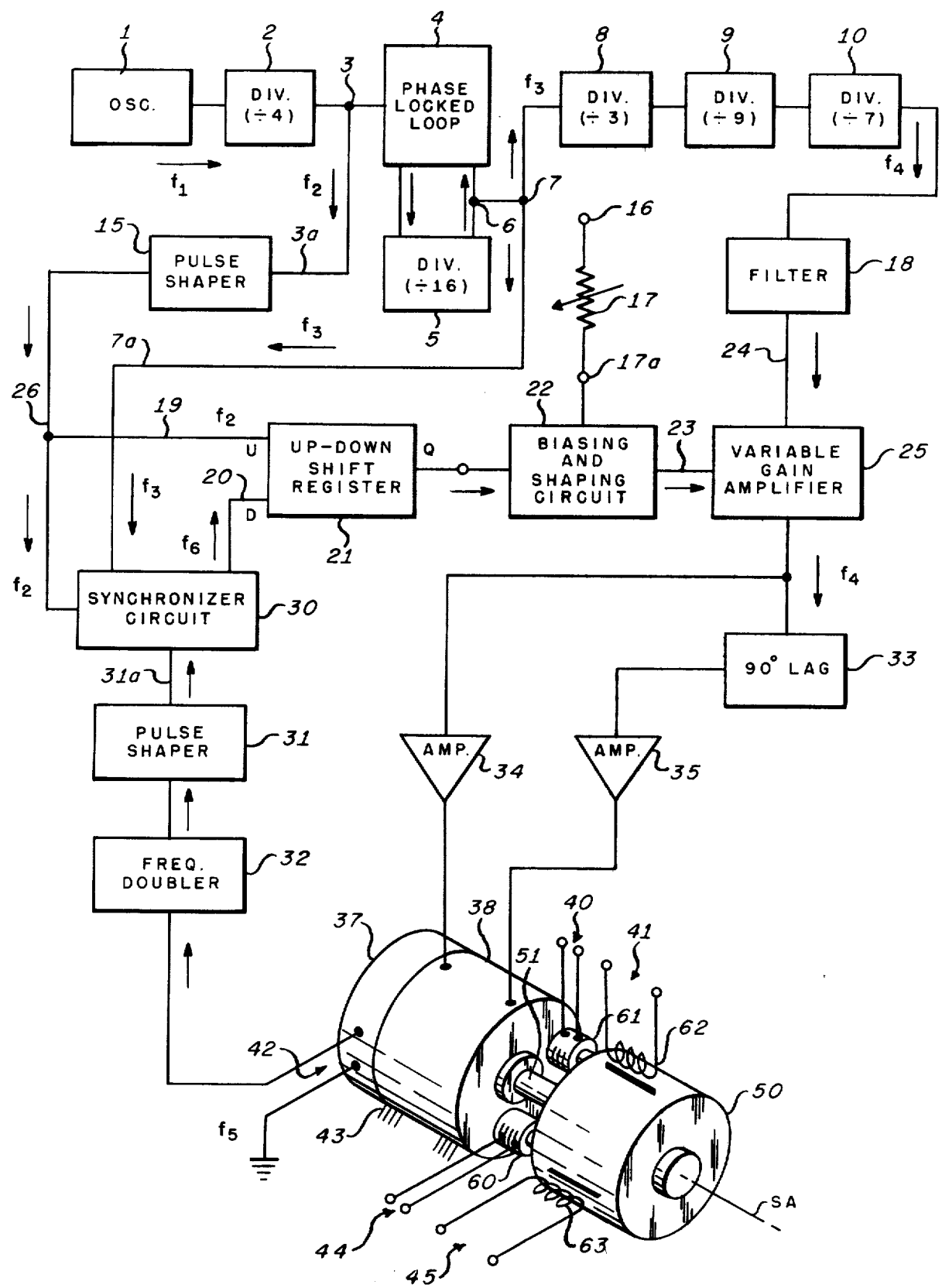
FIG. 1 is a diagram showing the electrical components of the invention and their interconnection with respect to a precision gyroscope.

Such gyroscopic instruments are normally associated with 90° spaced apart pairs of inductive pick offs for detecting angular displacement of the rotor 50 with respect to its spin axis SA (FIG. 1) about mutually perpendicular inertial axes, yielding corresponding electrical outputs on leads 40, 44. Cooperating quadrature-spaced pairs of similarly disposed torquing coils are also normally present, being activated by torquing currents supplied at terminals 41, 45. In FIG. 1, purely as a matter of convenience, each such pair of torquer coils is schematically represented by respective single torquer coil 62, 63 and each such pair of inductive pick offs is schematically represented by respective single pick off coils 60, 61. Normally, the signal from pick off coil 61, for example, is kept at null by passing it through leads 40 and a high gain amplifier (not shown) into torquer coil 63 to precess the gyroscope rotor 50 opposite to the precession caused by the input rate, thus keeping rotor 50 essentially aligned with the instrument casing 43, which case 43 is affixed to the craft. As noted, the rotor 50 is flexibly mounted on shaft 51 and is spun by the motor 38 inside of the instrument casing. In a similar manner, the signal from the quadrature pick off coil 60 is nulled through a similar gyro restoring loop (not shown) via leads 44 into torquer 62. It will be recognized, therefore, that the current driven into any one torquer coil 62 or 63 is proportional to the rate at which the gyroscope casing is being rotated as the craft itself correspondingly rotates about a respective inertial axis. As the craft on which the gyroscope is fixed rolls, for example, the gyroscope rotor 50 is maintained substantially fixed with respect to the casing by precessing rotor 50 in roll at the same rate that the craft is rolling. Consequently, craft roll rate, for example, can be precisely measured if the current passing through the corresponding torquer coil 62 or 63 is accurately measured. This measurement is conventionally accomplished by means which form no necessary part of the present invention.

Referring to FIG. 1, synchronization of operation of the gyroscope motor is effected by elements including oscillator 1 and the frequency divider chain including elements 2 through 10 found at the top of the drawing. Oscillator 1 may be a conventional crystal-controlled symmetric square wave train generator operating at frequency $f_1$. A conventional divider circuit 2 divides the frequency of the output of oscillator 1, producing a positive-going pulse train of frequency $f_2$ at junction 3. Next, the conventional phase locked loop 4 and divider 5 operate in the usual manner to yield a phase stable train of narrow positive-going pulses of frequency $f_3$ at junctions 6, 7. The successive frequency dividers 8, 9 and 10 operate on the $f_3$ signal at junction 7 to produce a positive-going square wave output of frequency $f_4$. These conventional dividers may have respective division moduli of 3, 9 and 7. In the preferred embodiment of the invention the phase locked loop 4 provides an output signal having a frequency $f_3$ at junctions 6, 7 which is a multiple, preferably 16, of the input reference signal frequency $f_2$. Thus, if oscillator 1 is a 19.2 kHz device, frequency $f_2$ will be 4.8 kHz, frequency $f_3$ will be 76.8 kHz, and frequency $f_4$ will be 406.3 Hz. However, the invention is not limited to the use of particular frequency divider moduli, nor is it limited to use of an oscillator 1 operating at a frequency $f_1$ of 19.2 kHz. Rational fractions are used as moduli in all frequency dividers.

For driving the motor 38, the constant amplitude square wave output of divider 10 is coupled through narrow band filter 18 to produce a symmetric, stable constant amplitude sine wave of frequency $f_4$ on lead 24. The frequency $f_4$ sine wave on lead 24 is supplied to a conventional analog multiplier 25 in the form, for instance, of a variable gain amplifier whose function is yet to be described, but wherein the signal of lead 24 is multiplied in amplitude by placing a unidirectional control signal on its second input lead 23. The output of multiplier 25 at frequency $f_4$ is coupled directly to a first power amplifier 34 and through a 90° phase shifter 33 to a second power amplifier 35 similar to amplifier 34. The amplified outputs of amplifiers 34, 35 furnish power to drive the two-phase motor 38, in turn, driving gyro rotor 50. As more energy is fed to drive motor 38, its speed of rotation tends to increase, and vice versa, even though frequency $f_4$ remains constant.

The remaining part of the system serves precisely to determine the speed of rotation of motor 38 in the desired manner by varying the amplitude of its sine wave excitation from amplifiers 34, 35. For this purpose, one additional control signal representative of the actual spin frequency of rotor 50 is to be generated. Such may be accomplished by coupling a conventional permanent magnet a.c. tachometer or spin-reference generator 37 mechanically to motor shaft 51. For example, the aforementioned Wing U.S. Pat. No. 2,719,291 illustrates just such a two-phase spinfrequency generator for producing the desired 90° phase displaced reference voltages. Alternatively, the desired rotor spin reference signals may be derived from the output of the gyroscope tilt pick off system, for instance, in the general way described in the aforementioned Quermann U.S. Pat. No. 3,557,629. Such a spin frequency sine wave signal at terminals 42 of generator 37 of frequency $f_5$ equal to 2.4 kHz is coupled to a conventional frequency doubler 32 and is then applied as a positive going square wave to pulse shaper 31. The square wave output of doubler 32 of frequency $2f_5$ is thereby converted into a train of positive going narrow pulses and is coupled to a synchronizer circuit 30 further to be discussed in connection with FIG. 2. Other frequencies for $f_5$ will be used depending upon the circumstances, though when a conventional spin reference generator 37 is used with 400 Hz excitation of motor 38, the output frequency $f_5$ on leads 42 will be 2.4 KHz in the steady operating state. As will be seen, synchronizer circuit 30 converts the output of pulse shaper 31 into a positive going train of pulses of frequency $f_6$, using the $f_3$ input from junction 7 to prevent coincidence of pulses from shaper 31 with any one of the pulses in the frequency $f_2$ reference pulse train from junction 3, as will be discussed with respect to FIG. 2. The reference wave train of junction 3 is first subjected to the action of a pulse shaper 15 similar to pulse shaper 31; thus, the signals on leads 19, 20 are made to have substantially the same amplitude, shape, and duration. It will be understood that the number of pulses per second at the output 20 of synchronizer circuit 30 is a measure of the speed of gyro rotor 50.

The frequency $f_2$ wave train from the reference divider 2 and the wave train of frequency $f_6$ of synchronizer circuit 30 are respectively coupled to cooperating inputs of a conventional up-down shift register 21. The synchronizer circuit 30 output pulses activate the countdown line 20 of shift register 21, while the crystal-controlled train of pulses from divider 2 activates the count-up line 19 of the shift register 21. An output signal is derived in the usual manner from the Q output of one of the middle stages of shift register 21. Each pulse on the count-up line 19 shifts a ONE into the register, moving the pulse train Q output amplitude toward, say a +5 volt level. Each pulse on the count-down line 20 shifts a ZERO into register 21, tending to move its Q output to the zero volt level. The count-up line 19 has a constant number of pulses applied to it per second (at the 4.8 kHz rate). As the gyroscope rotor 50 initially comes up to speed on being started, the frequency $f_5$ of the signal on the output leads 42 of the gyro spin reference generator 37 is below 2.4 kHz and a pulse rate less than 4.8 kHz appears on the count-down line 20. This situation results in the shift register 21 being filled with ONEs, with its Q output remaining substantially at the maximum (+5 volt) level. Should the rotational speed of rotor 50 exceed 400 Hz, so that the output $f_5$ of reference generator 37 reaches 2.4 kHz, more pulses must inherently appear on count-down line 20 than on count-up line 19; the Q output of register 21 at terminal 21a then falls toward zero volts.

When the frequency of the gyro spin reference signal becomes precisely 2.4 Hz and $f_6$ equals $f_2$, the signal found at the Q output 21a of register 21 is a pulse width controlled positive-going substantially square wave with the pulse width proportional to the phase difference between the 4.8 kHz pulses at leads 42 and those derived from divider 2 as parts of a stable reference pulse train. Then, the nominal d.c. components of the Q output signal is +2.5 volts. If the spin rate of rotor 50 tends to slow, the positive-going pulse width increases, producing an increasingly greater direct current component, and therefore providing a higher amplitude excitation of motor 38. Conversely, if rotor 50 speeds up, a lesser directional current component is produced and the excitation level of motor 38 is correspondingly decreased, allowing it to slow.

Figure 2:
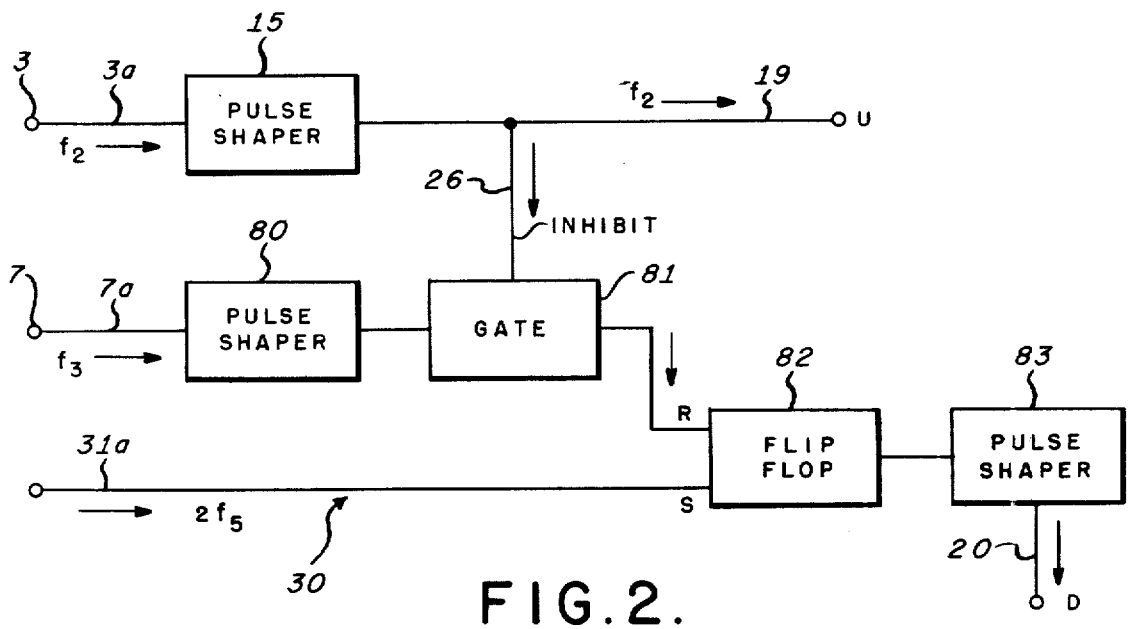
FIG. 2 is a detailed diagram of the synchronizer circuit 30 of FIG. 1.

FIG. 2 illustrates in more detail one form which the synchronizer circuit 30 may take. As has been noted, the general purpose of synchronizer circuit 30 is to take the asynchronous pulses generated by the gyroscope motor frequency doubler 32 ($f_6$) and to synchronize them precisely with the system clock frequency $f_3$ (76.8 kHz) found on junction 7. The pulses from doubler 32 are applied to the count-down line 20 of up-down shift register 21. The system clock pulses $f_3$ are applied after pulse shaping (15) to the count-up line 19 of shift register 21.

A problem arises in this operation making necessary the use of a further control circuit within synchronizer 30 to ensure that pulses are not supplied simultaneously to the respective up and down count inputs 19, 20 of shift register 21, an event which would render its operation inaccurate. In FIG. 2, it is seen that pulses generated by the gyroscope rotor reference generator 37, doubler 32, and shaper 31 are coupled to the set input via lead 31a of flip flop 82. When flip flop 82 is reset by the output of gate 81, the consequent change of state of flip flop 82 excites a conventional pulse shaper 83, and this event applies a pulse to the count-down lead 20 of shift register 21.

The pulse train of frequency $f_2$ (4.8 kHz) which acts as the system clocking signal constantly applies count-up pulses to input 19 of shift register 21 via pulse shaper 15. When a pulse is present on the count-up line 19, it closes gate 81 via inhibit lead 26, preventing flip flop 82 from being reset. This event ensures that a count-down pulse may be present at input 20 only at a time other than when a count-up pulse is present on lead 19. Flip flop 82 is so arranged that, if a 76.8 kHz pulse is present at the same time as the pulse from reference generator 37, flip flop 82 is set and information is transferred to pulse shaper 83 when the next clock pulse appears on lead 19.

Figure 3:
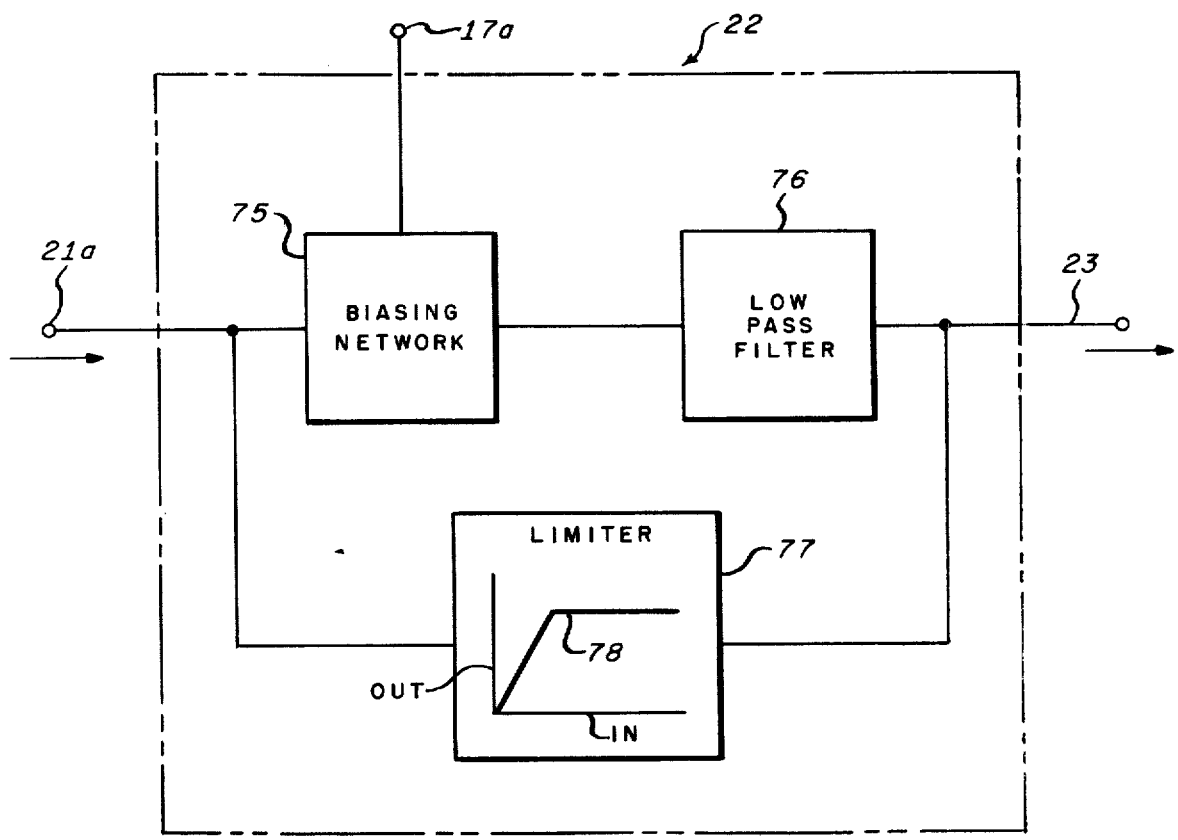
FIG. 3 is a detailed diagram of the shaping circuit 22 of FIG. 1.

The Q output of up-down shift register 21 of FIG. 1 is applied to the signal biasing and shaping circuit 22 shown in more detail in FIG. 3. Referring to FIG. 3, network 22 receives the output of shift register 21 at terminal 21a, where a calibrating direct current bias may be added via terminal 17a from a conventional stable source (not shown) at terminal 16 (FIG. 1) via manually adjustable resistor 17. As in FIG. 3, biasing network 75 may take any of several known forms and will usually contain a direct current amplifier responsive to the respective signal and bias currents on terminals 21a, 17a, the output of network 75 being subjected to the shaping action of a low pass filter 76 for eliminating alternating components and then being supplied via lead 23 to control the gain of multiplier or amplifier 25. The output of filter 76 is coupled back through a conventional limiter 77 having the conventional limiter characteristic 78 illustrated thereon to the input 21a of biasing network 75 for the purpose of limiting the maximum voltage applied to the windings of motor 38 to about 8.5 r.m.s. volts. By this means, reliable capture of the gyroscope motor speed is permitted without the use of elaborate time-controlled shaping networks. A typical gyroscope rotor normally operates at a 6.25 r.m.s. volts from circuit 22.

Accordingly, it is seen that the invention provides a means for the precise and efficient driving of a rate gyroscope rotor, the invention overcoming the defects of the prior art by providing a stable synchronous frequency drive signal which is automatically varied in amplitude so that the gyroscope rotor is driven constantly at a subsynchronous rate. This causes the magnetic poles of the hysteresis ring of the rotor to slip at a constant differential rate, beneficially to zero averaging the effective drifts which may vary with magnetic pole position and magnitude. The synchronous gyroscope is not modified from its prior design; the same instrument may be used whether use of the present invention is or is not required.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. An improved gyroscope of the type having a rotor coupled to a synchronous motor which has randomly synnchronizing permanent magnetic poles, wherein the improvement comprises:
    means for generating an excitation drive signal for said synchronous motor having a constant stable frequency and a variable amplitude;
    means for generating a speed signal proportional to the frequency of rotation of said gyroscope rotor coupled to said synchronous motor;
    means for comparing the phase of the speed signal to the phase of the excitation drive signal and providing an output signal proportional to the difference thereof; and
    means for varying the amplitude of the excitation drive signal responsive to the output signal of said phase comparator means, such that the excitation drive signal applied to said synchronous motor maintains the frequency of rotation of said synchronous motor at a constant subsynchronous frequency slower than the constant stable frequency of the excitation drive signal;
    whereby the rotation of said synchronous motor at the constant subsynchronous frequency causes the permanent magnetic poles of said synchronous motor to rotate.

2. An improved gyroscope according to claim 1 wherein said means for providing an excitation drive signal includes dividing means responsive to the output of a phase locked loop coupled to the divided output of an oscillator.

3. An improved gyroscope according to claim 2 wherein said means for varying the amplitude of the excitation drive signal includes a variable gain amplifier.

4. An improved gyroscope according to claim 3 wherein said speed signal generator means includes pick-off means coupled to a synchronizer circuit.

5. An improved gyroscope according to claim 4 wherein said phase comparator means includes a shift register responsive to said synchronizer circuit and the divided output of said oscillator.

6. An apparatus according to claim 5 wherein said phase comparator means further includes a biasing and shaping circuit.

* * * * *